Patented Dec. 18, 1923.

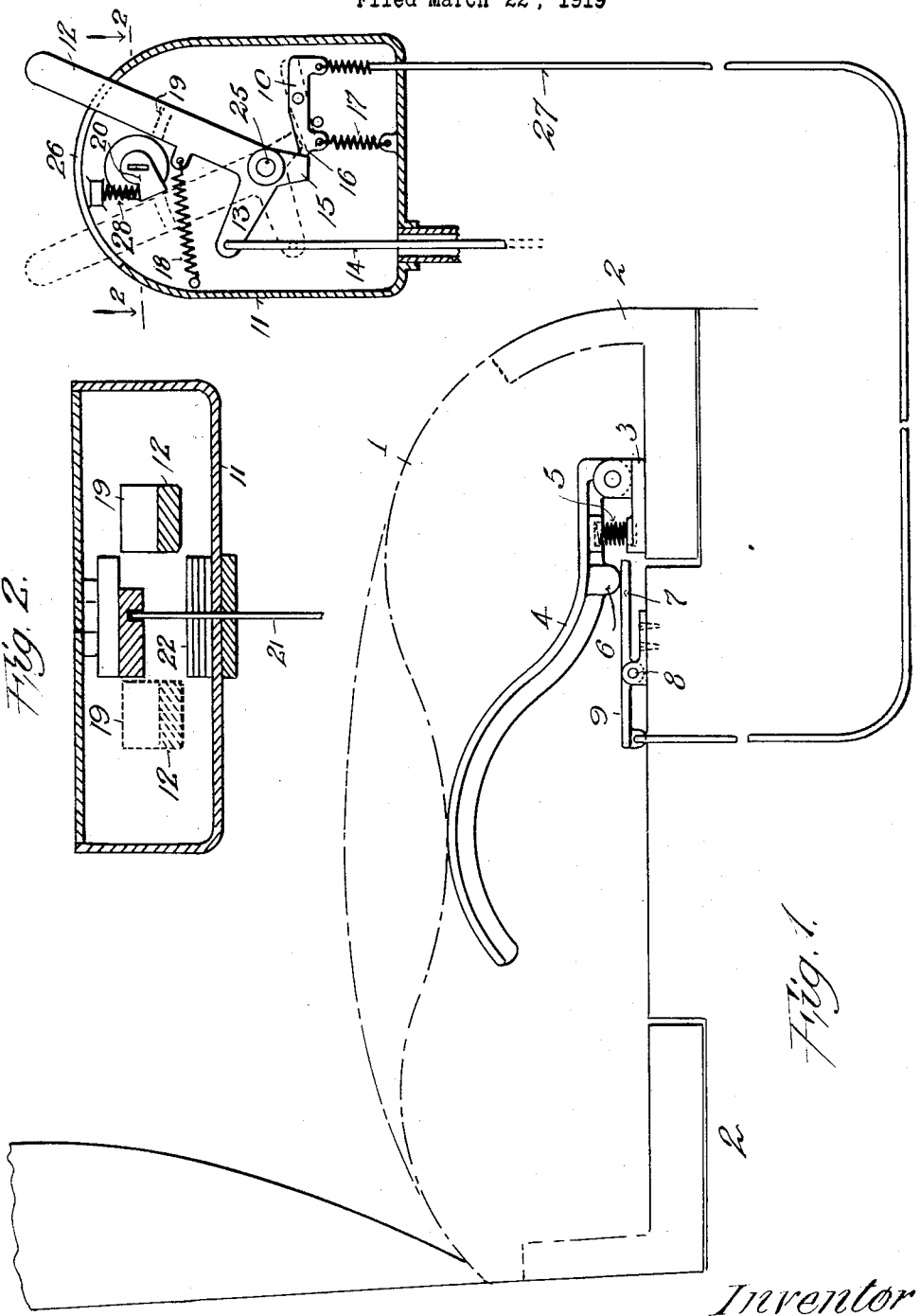

1,477,771

UNITED STATES PATENT OFFICE.

HAROLD ROWNTREE, OF KENILWORTH, ILLINOIS, ASSIGNOR TO NATIONAL PNEUMATIC COMPANY, OF NEW YORK, N. Y., A CORPORATION OF WEST VIRGINIA.

AUTOMATIC AUTOMOBILE LOCK.

Application filed March 22, 1919. Serial No 284,408.

*To all whom it may concern:*

Be it known that I, HAROLD ROWNTREE, a citizen of the United States, residing at Kenilworth, county of Cook, State of Illinois, have made a certain new and useful Invention in Automatic Automobile Locks, of which the following is a specification.

This invention relates to automatic automobile locks.

The object of the invention is to provide a lock for automobiles to prevent theft of the machine.

A further object of the invention is to provide a lock for automobiles which is controlled automatically.

A further object of the invention is to provide a locking device for automobiles which is controlled conjointly by the weight of the driver of the machine when occupying his seat, and a key controlled stop under the control of the driver of the machine.

A further object of the invention is to provide a locking device of the nature referred to which cannot be released from locking condition so long as the control key remains inserted in the lock device, and which cannot be thrown into locking position from its retracted position so long as the driver occupies his seat, but which will be automatically thrown into locked position when the driver leaves his seat.

Other objects of the invention will appear more fully hereinafter.

The invention consists substantially in the construction, combination, location, and relative arrangement of parts, all as will be more fully hereinafter set forth, as shown by the accompanying drawing and finally pointed out in the appended claims.

Referring to the accompanying drawing:

Fig. 1 is a view partly in elevation and partly in vertical section showing an automobile locking device embodying my invention and the application thereof to the seat of an automobile.

Fig. 2 is a section on the line 2, 2, Fig. 1 looking in the direction of the arrows.

The same part is designated by the same reference character wherever it occurs throughout the several views.

Many different kinds of automobile locks have been proposed with a view to preventing unauthorized use or theft of the machine, and wherein one part or another of the mechanism of the car required to be operated, in order to start the car, has been locked. In many cases of automobile locks at present on the market the driver of the car is required to perform some act to effect the locking operation before he leaves the car, and it sometimes happens that the driver or chauffeur leaves the car and forgets to perform that locking act, or else, intending and expecting to leave the car only a few seconds, is detained for a considerable period of time during which the car is left unlocked and liable to be taken or stolen. These are serious objections to many of the forms of automobile locking devices at present on the market, and which among others, a locking device embodying the principles of my invention is designed to avoid. In accordance with my invention I propose to employ a locking device which is controlled by the weight of the chauffeur upon his seat conjointly with a key with which the chauffeur is provided. The locking device is retained in its retracted or unlocked position by a movable detent against the action of a force tending to shift it into locking position. So long as the detent retains the lock operating member in its unlocked position, then, whatever part of the machine is rendered inoperative by the lock control device, is left free to operate in its normal manner. The moment, however, the detent is withdrawn the lock control member is automatically thrown into its locked poistion, thereby applying the lock. When the lock control member is in its locking position it is retained in that position by a spring actuated catch. This catch is released from retaining position by means of a key adapted to be inserted through a key hole for the purpose. The key hole is located between the locking and unlocked positions of the lock control member. The detent which retains the lock control member in its unlocking position is controlled in any suitable or convenient manner by the chauffeur or driver, preferably automatically, by his weight imposed upon the seat through suitable operating connections, whereby the detent is withdrawn when the driver or chauffeur leaves his seat. It will be observed from this general statement of the nature of my invention that the act of the chauffeur or driver in leaving his seat results in the lock controlling member being thrown into locking position without any other act on the part of the chauffeur or driver except that of raising his weight from the seat. Therefore there is nothing the chauffeur must remember to do when leaving the car in order to efficiently lock the car against the danger of being started or stolen, and, as above indicated, when the lock controlling member is in locking position it cannot be restored to unlocked position until a key is employed by the chauffeur to shift the spring catch, and as the key hole for the key is located between the unlocked and locking positions of the locking member the key must be removed before the locking member can be restored to its unlocking position.

Referring to the drawing in which I have shown a simple and operative embodiment of my invention, reference numeral 1 designates the seat on which the chauffeur sits while driving the car. As is customary this seat is flexible, and is carried by the seat framework 2 in the usual manner, and which may be of the usual or any other well known or ordinary structure. Carried by the seat frame is a hinge casting 3 to which is pivoted one end of a lever 4. This lever is curved at its free end and the curved end portion bears against the underside of the flexible seat so that when the weight of the chauffeur is imposed on the seat the lever 4 is depressed rocking about its hinge connection to the casing 3. The lever 4 may be yieldingly maintained, elevated or raised in any suitable or convenient manner. A spring 5 is shown interposed between the lever and the casting 3 for this purpose. The lever 4 is provided with a depending lug 6 arranged to cooperate with one end 7 of a lever which is pivoted as at 8 intermediate its ends so that when the weight of the chauffeur is imposed on the seat the lever 4 is depressed thereby causing the lug 6 to engage the end 7 of the rock lever and depress the same, thereby elevating the end 9 of said rock lever.

The automatic lock control devices are shown enclosed within a box or casing 11 within which is pivotally mounted as at 25 a bell crank lever, one arm 12 of which extends through a slot or opening 26 in the wall of the control box 11 and the other arm 13 of which is connected through connections 14 or otherwise to the lock, not shown, by which the desired operating part of the machine is to be held against or released for operation. As above indicated a locking arrangement embodying my invention is applicable to any desired part concerned in the operation of a car, for example, the connection 14 may be associated with the supply of fuel so that when thrown into locking position the supply of operating fuel is cut off, or, if desired, the lock device may be applied to a wheel of the car to prevent its rotation or to the steering gear. The particular part to be locked, however, forms no part of my invention as the application of the locking mechanism embodying my invention for use to any desired part to be locked can be effected by any mechanic or other person skilled in the art and without difficulty.

It will be observed that the bell crank lever with the arms 12, 13 constitutes a lock control member, and by reason of the end 12 thereof projecting through the wall of the lock casing it is readily accessible for the necessary manipulation.

The lock control member is provided with a lug or projection 15 and when the lock control member is in its retracted or unlocked position it is held and retained in such position against any desired tension or force, such, for example, as a spring 18 exerted thereon tension to throw said member into its locking position, by means of the end 16 of a detent 10 engaging behind the lug 15 of the locking member. This is the relation of the parts shown in full lines in Fig. 1. By withdrawing the end 16 of the detent 10 from engaging relation with respect to the lug 15, the lock controlling member is free to be thrown by the spring 18 into its locking position as indicated in dotted lines thereby through the connection 14 effecting the locking action upon the desired part of the machine to be locked. A spring 17 is connected to the detent 10, and normally exerts its tension upon said detent to draw the end 16 of the detent out of engaging relation with respect to lug 15 of the lock control member. The action of the spring 17 is controlled by the chauffeur. For example, in the automatic arrangement shown, the spring 17 is restrained from withdrawing the end 16 of the detent 10 from engaging relation with respect to lug 15 by a suitable connection, such for instance, as a wire or other connection 27 which is connected at one end to the detent 10, and at the other end to the arm 9 of the rock lever which is controlled by the weight of the driver imposed upon the seat 1. With this arrangement it will be seen as long as the chauffeur occupies the seat 1, the detent 10 is held in position for the end 16 thereof to engage and form a detent for the lock control lever to hold the latter in its restrained or unlocked position. The instant the weight of the chauffeur is released from the seat the spring 17 acting upon the detent is free to pull the end 16 out of engagement with the lug 15. When this occurs the locking control lever is automatically thrown by tension device 18 into its locking position thereby immediately locking the automobile. The lever arm 12 is provided with a lug or extension 19, which, as said lever moves from its retracted into its locking position, wipes by a pivoted catch 20 which is thereby rocked against the action of a spring 28 so as to be raised to permit the lug 19 to pass thereby. As soon as the lug 19 has passed the catch device 20 the latter is restored to its initial position by spring 28 so as to engage behind the lug 19 thereby forming a stop to hold said locking member in its locking position. The spring actuated catch 20 is released from its locking position with respect to lug 19 by means of a key 21, see Fig. 2, adapted to be inserted through the wall of the lock box. In practice I prefer to employ a special key fitted to tumblers 22 of a combination lock to insure greater safety although it is evident that my invention is not to be limited or restricted in this respect.

After the spring catch is rocked from engaging position behind the lug 19 on the lock controlling member 12 by the actuation of the key 21, the lock controlling member 12 is rocked manually towards its unlocking position sufficiently far for the spring catch to rest upon the upper surface of the lug. The key 21 is then withdrawn from the lock and the lock controlling member 12 is then restored to its initial retracted position as shown in full lines in Fig. 1. If the driver or chauffeur is sitting upon the seat 1, when the lock controlling member reaches its fully retracted position then the end 16 of detent 10 will snap into engagement behind the lug or extension 15 and retain said locking member in its retracted position. If the chauffeur is not sitting upon the seat the detent 16 will be retained in its retracted position and therefore the locking member 12 will not be retained in its retracted position but will be returned to its locking position indicated in dotted lines by the tension device 18.

It will be observed that the keyhole for the key which controls the spring catch 20, is disposed between the fully retracted and the fully advanced or locking positions of the lock controlling member 12, so that if the key 21, employed to release the spring catch 20, is left in the lock after the locking member has been released from the spring catch 20, then said locking member cannot be returned or restored to its unlocked position since the key will form an obstruction to prevent. Therefore, in the specific form and arrangement shown, not only must a key be used to release the spring catch, but the key must be removed and the chauffeur must exert sufficient pressure on the seat before the locking connections are actuated to unlock the machine.

Of course, it will be understood that when a lock with tumblers 22 is employed, any ordinary form of key operated tumbler lock will answer the purpose.

From the foregoing description it will be observed that I provide an exceedingly simple safety device or lock controlling mechanism for automobiles in which the operating parts are contained in a small casing which can be conveniently placed upon the dashboard of a car or in any other convenient location convenient for the manipulation of the control member, the end of which projects outside the casing. It will also be seen that the retention of the lock controlling member in its retracted position is under the control of the chauffeur, and, in one embodiment of my invention, the control of the retaining device is effected by the weight of the chauffeur imposed upon the seat. It will also be seen that at the instant the chauffeur leaves his seat for any reason the retaining devices which hold the locking mechanism out of action are released and the locking mechanism is automatically actuated to effect the locking of the car. This action requires no key. When, however, the devices are to be restored to their unlocked position a key is required, which, however must be withdrawn before the parts can reach their fully retracted positions. Since the lock controlling member cannot be moved to its unlocked position until the key is removed from the lock, and since the use of a key is not required for placing or maintaining the lock controlling member in locking position, there is no possibility of the driver or chauffeur accidentally leaving the key in the controller when he leaves the car, and consequently the danger of having the car unlocked and stolen through the neglect or carelessness of the driver is eliminated.

Should the driver desire to "tune up" his motor, he can place the key in the key hole before leaving his seat, thereby preventing the lock controlling member from moving into locking position, thereby permitting the operation of the engine or its control without interference from the locking control even when the driver is not on his seat.

It will also be seen that a structure and arrangement embodying my invention is exceedingly simple and economical to manufacture and may be readily and easily applied to any of the ordinary or usual makes of cars.

Having now set forth the objects and nature of my invention, and a construction embodying the principles thereof, what I claim as new and useful and of my own invention and desire to secure by Letters Patent is:—

1. In an automatic lock control device for automobiles, the combination with lock-actuating connections, of an operating member therefor mounted to oscillate between two extreme positions, means normally tending to move said member to one of said positions for actuating said connections to locking position, a plurality of projections on said member, a pivoted member mounted to engage one of said projections for holding said member in lock-restraining position, and means for engaging another of said projections for holding said member in lock-actuating position.

2. In an automobile lock control device, the combination with lock-actuating connections, of an operating member therefor pivotally mounted to oscillate between two extreme positions, means normally tending to move said member to one of said positions for actuating said connections to locking position, means for locking said member in said named position, and automatically releasable means for restraining said member in the other of said two positions.

3. In a lock control device for automobiles, the combination with lock actuating connections, of an operating member therefor mounted for oscillation between two extreme positions, means normally tending to move said member into one of said positions for actuating said connections to locking position, and means controlled by the weight of the driver of the car upon his seat for restraining said member in the other of said positions.

4. In a lock control device for automobiles, the combination with lock actuating connections, of an operating member therefor pivotally mounted for oscillation between two fixed positions, means normally tending to move said member into one of said positions to actuate said connections to locking position, means to secure said member in said position, and means under the control of the driver of the car for restraining said member in the other of said positions.

5. The combination with lock actuating connections, a control member therefor having a projection and a lug, means normally tending to actuate said member into lock actuating position, means to engage said lug and a releasable detent cooperating with said projection to hold said member in lock restraining position.

6. The combination with lock actuating connections, a control member therefor having a catch projection and a locking lug, means normally tending to actuate said member into lock operating position, means to engage said locking lug, a releasable detent cooperating with said projection to hold said member in lock restraining position, and means under the control of the driver of the car for releasing said detent.

7. The combination with lock actuating connections, a control member therefor having a catch projection, a locking lug, means normally tending to actuate said member into lock operating position, means to engage said locking lug, a releasable, detent cooperating with said projection to hold said member in lock restraining position, and connections under the control of the driver of the car for maintaining said detent in engaging relation.

8. The combination with locking connections, of an operating member therefor, means normally tending to move said member in a direction to operate said connections into lock operating position, means to engage said member in locked position, a detent to retain said member in retracted position, means normally tending to release said detent, and means under the control of the driver of the car for controlling said releasing means.

9. The combination with lock operating connections for an automobile, of a pivotally mounted lever having an arm connected to said connections, said lever also having a projection, a detent for said lever to hold the same in retracted position, a spring normally tending to release said detent, a rock lever arranged to be depressed by the driver of the car and connections actuated by said rock lever when depressed to prevent the release of said detent.

10. The combination with locking connections for an automobile, of an actuating member therefor movable between two fixed positions, means normally tending to move said member into one of said positions to lock the car, an automatically controlled detent for retaining said member in the other of said positions, and a spring catch device to retain said member in its first named position.

11. The combination with locking connections for an automobile, of an actuating member therefor movable between two fixed positions, means normally tending to move said member into one of said positions to lock the car, an automatically controlled detent for retaining said member in the other of said positions, a spring catch device to retain said member in its first named position, and means for releasing said spring catch device.

12. The combination with locking connections for an automobile, of an actuating member therefore movable into restraining and into locking positions, means normally tending to move said member into locking position to lock the car, an automatically controlled detent for retaining said member in the restrained position, and a key releasable spring catch device to retain said member in its locking position.

13. In a lock control device for automobiles, a box or casing, lock governing connections extending into said box or casing, an operating member for said connections, said member mounted within but having a portion extending to the exterior of said box or casing, said member movable into lock applying and fixed positions, means located within said box or casing but releasable by the driver of the automobile for restraining said member in one of its positions, and a key-released catch device also located within said box or casing and arranged to automatically engage said member when in its other position.

14. In a lock control device for automobiles, the combination of locking connections with means whereby the locking connections automatically assume their locking position whenever the driver vacates his seat, and key releasing means for releasing said locking connections from their locking position.

15. In a locking device for automobiles, the combination with locking connections of means automatically controlled by the action of the driver vacating his seat for causing the locking connections to assume their locking position, a key releasable spring catch for retaining the locking connections in locking position, and a key hole for said releasing key so located that the locking connections cannot be moved to unlocking position until the releasing key is removed.

In testimony whereof I have hereunto set my hand on this 21st day of March A. D., 1919.

HAROLD ROWNTREE.